March 17, 1959 F. C. REED 2,877,717
CARBON BLACK APPARATUS
Filed Nov. 24, 1952 5 Sheets-Sheet 1
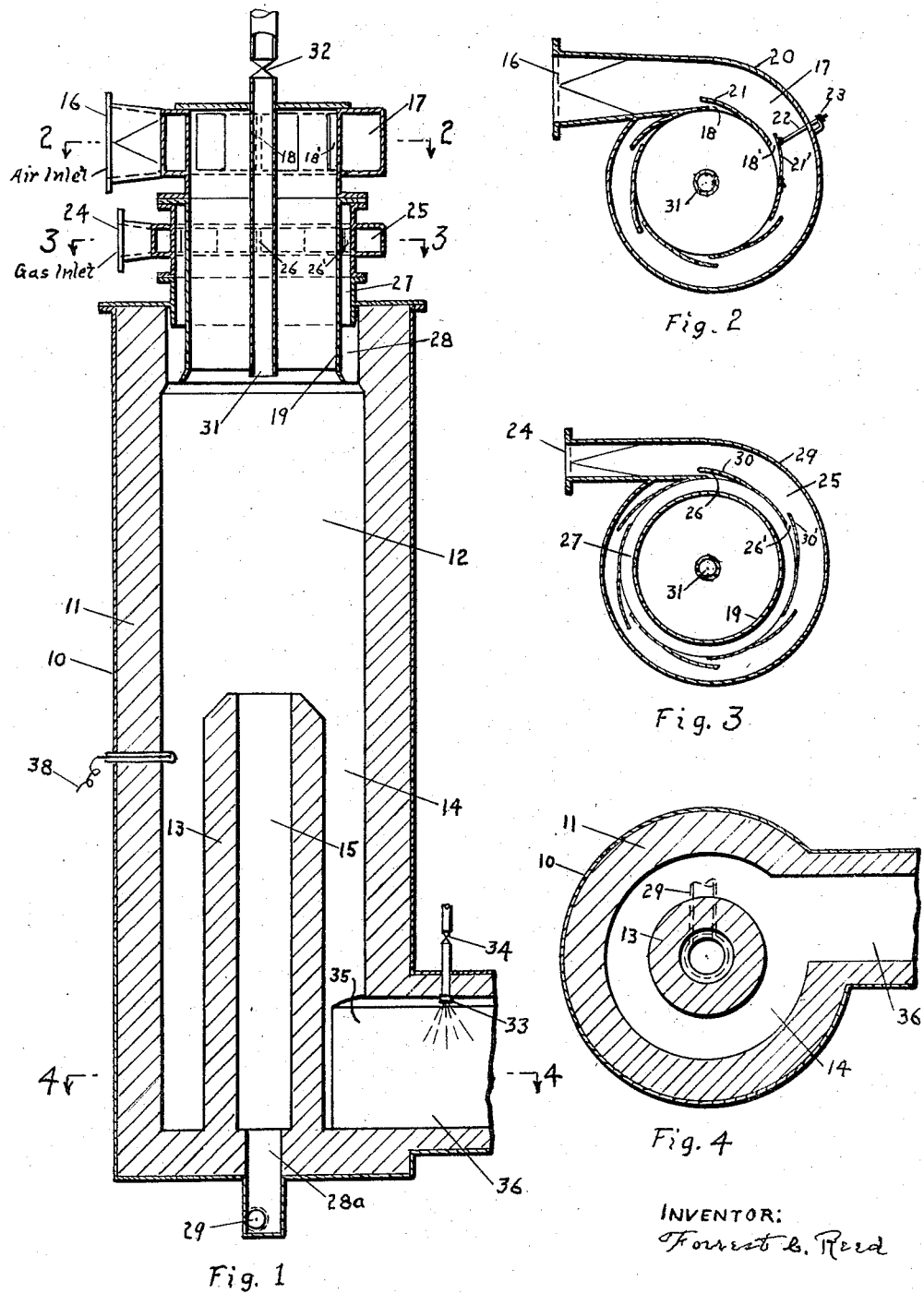

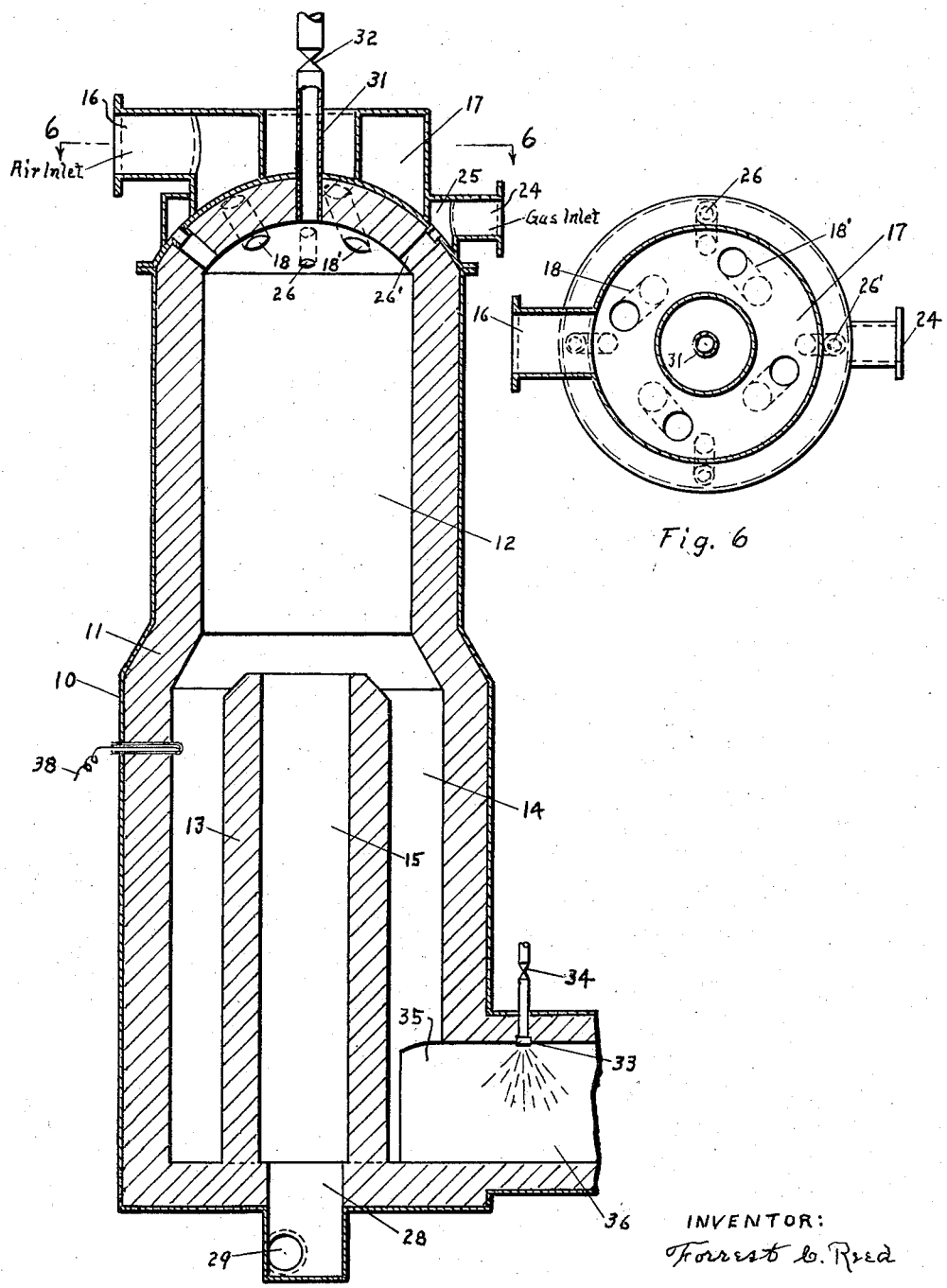

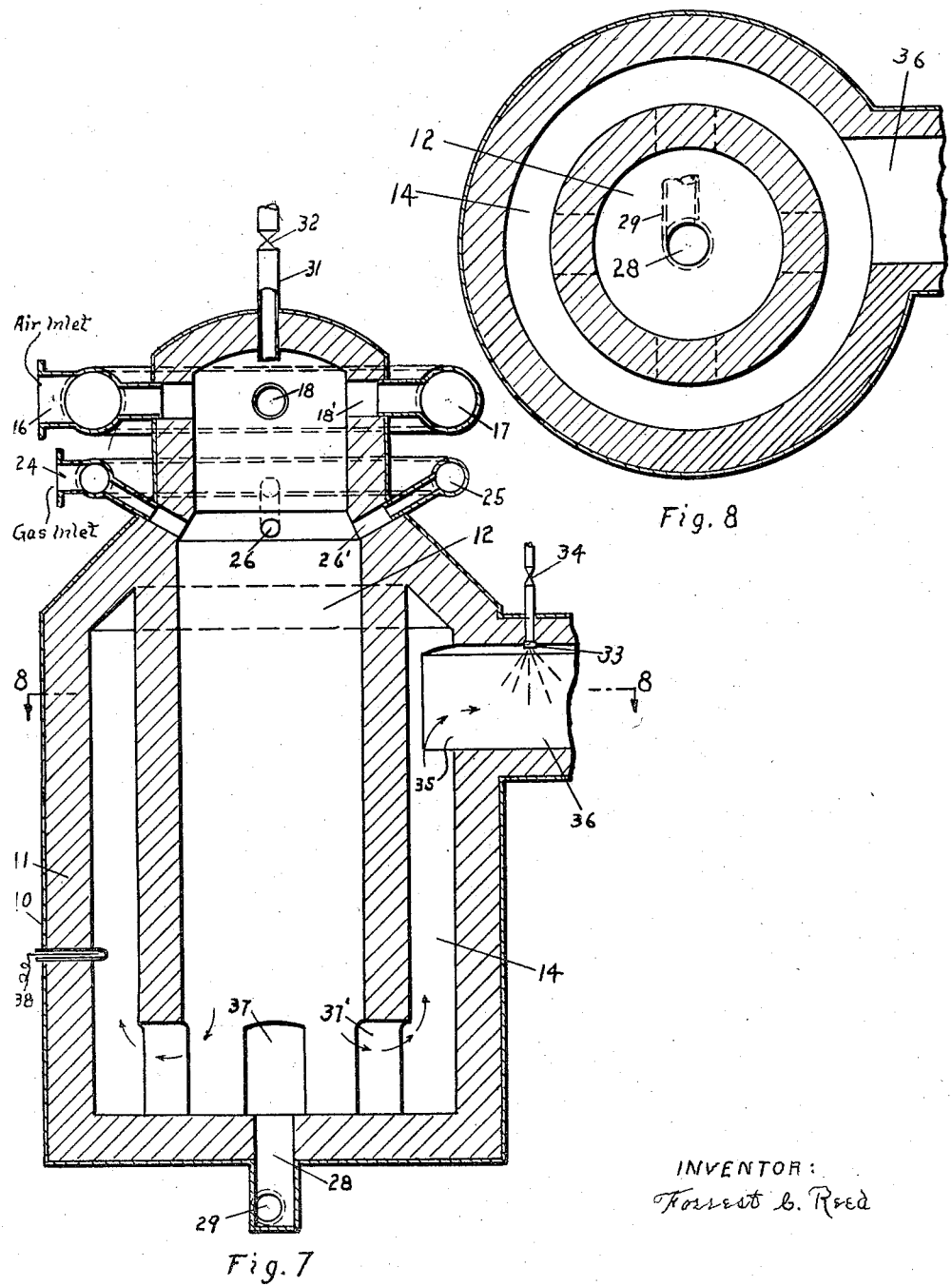

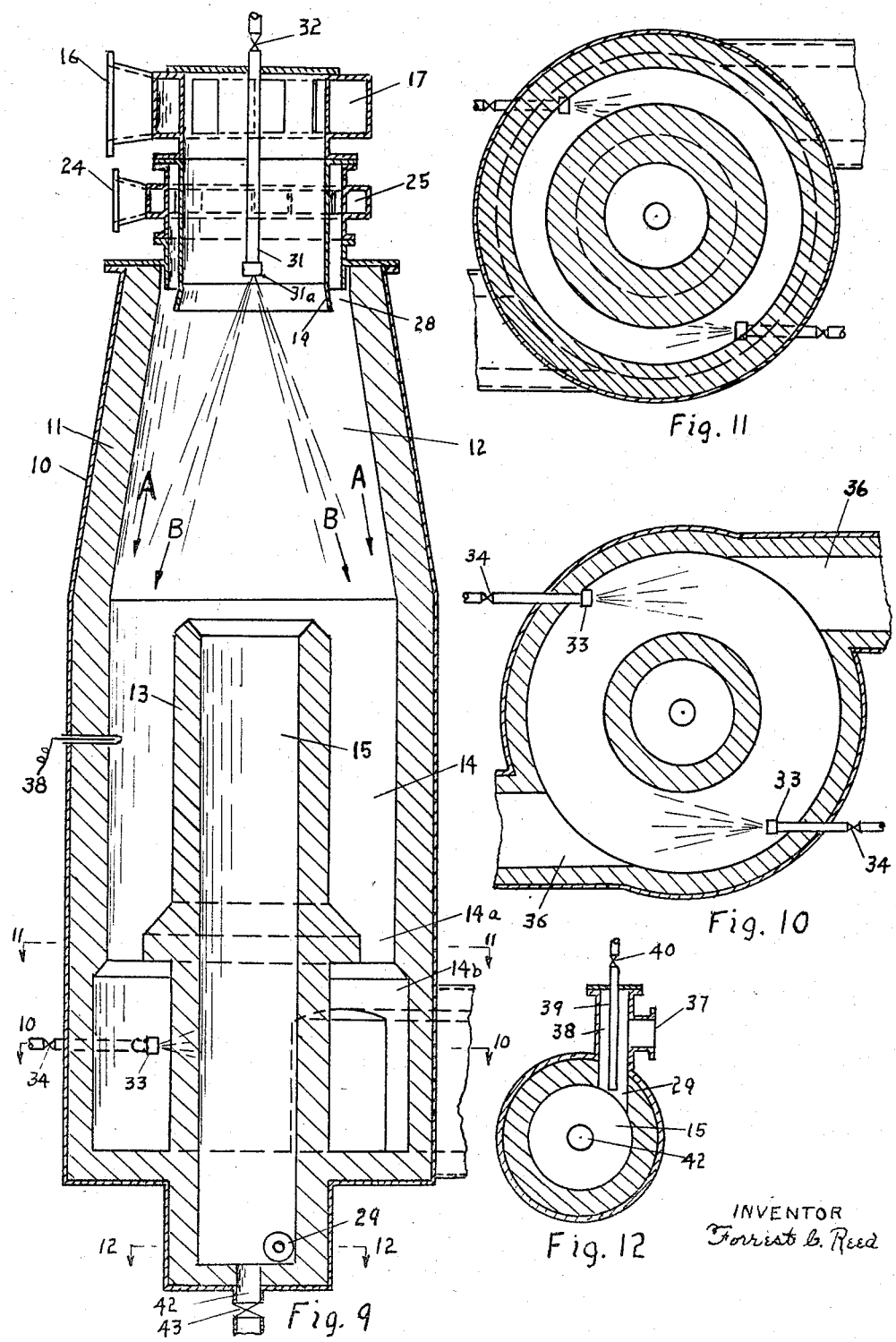

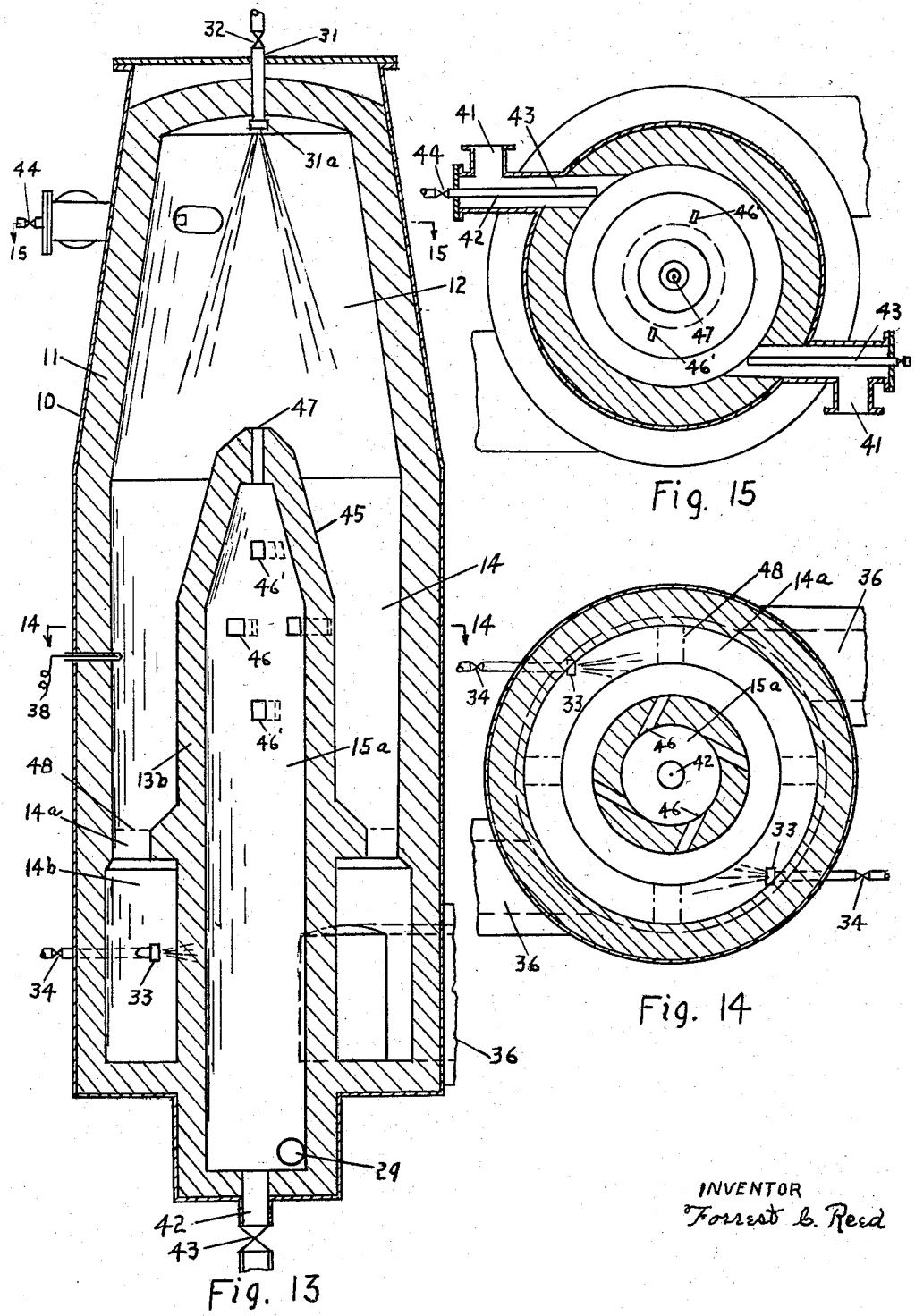

United States Patent Office 2,877,717
Patented Mar. 17, 1959

2,877,717

CARBON BLACK APPARATUS

Forrest C. Reed, San Francisco, Calif.

Application November 24, 1952, Serial No. 322,215

7 Claims. (Cl. 23—259.5)

This invention relates to a new and useful process for producing carbon black by the dissociation of a hydrocarbon by incomplete combustion and by contacting with hot gases and particularly where dissociation is expedited by heated refractory surfaces. This application is a continuation-in-part of my copending application Serial No. 95,511, filed May 26, 1949, and now abandoned. Attention is also directed to my copending application Serial No. 274,799, filed March 4, 1952, and which is also a continuation-in-part of above application Serial No. 95,511.

The primary object of the present invention is to provide a continuous method of producing carbon black of superior quality and to provide a method whereby high yields of commercially useful carbon black are obtained. A further object is to provide a method whereby carbon blacks of different characteristics can be produced in the same apparatus by controlling the operating conditions. A still further object is to provide a process which permits of larger capacities with any given size of apparatus thus being economical to operate.

Carbon blacks vary in particle size depending on the method of production and are in general classed as hard blacks and soft blacks according to the modulus at a given elongation (usually 400%) for natural rubber compounded therewith, the hard blacks having a modulus of about double that of soft blacks for a given time of cure. The finer particle size of hard black is made by the well known channel process while the larger particle size is made by various furnace processes. Some soft blacks are made by the furnace processes and some are made by the so called thermal processes where alternate periods of heating and dissociation are carried out in closed retorts containing checkerwork. In some processes the particle size is reduced by the use of diluent gases in which case the tail gases from the process are usually recycled with gas to be dissociated or with the air for partial combustion. Carbon blacks are therefore classed under various names as e.g., hard black, soft black, conductivity black, colloidal carbon, channel black, fine furnace black, high modulus black, lamp black, reinforcing furnace black, high abrasive black etc., all of which materials are included in the term "carbon black" as used in the specification and claims herein.

The terms "hydrocarbon" and "a potentially reactive hydrocarbon" as used in the specification and claims herewith include any hydrocarbon-containing gas, coke oven gas, atomized or vaporized oils, a mixture of natural gas and vaporized or atomized oil, natural gas, or any other compound containing hydrocarbons such unsaturated hydrocarbons contained in or produced by the partial cracking or reforming of oil or gas. The term "gaseous fuel" as used in the specification and claims herewith include any hydrocarbon-containing gas, natural gas, vaporized or atomized oil, a mixture of any hydrocarbon-containing gas and vaporized or atomized oil, or a mixture of natural gas and vaporized or atomized oil. The term "air" includes any oxygen supplying gas.

In my U.S. Patent 2,163,630, June 27, 1939, I have disclosed a process for producing carbon black of high quality and with high yields and wherein the advantages of contacting surfaces under proper conditions are set forth. The conditions being that the hot dissociation zone should be relatively short and the time of contact of the hot gases with highly heated surfaces should be limited to only a fraction of one second. The catalytic influence of refractory surfaces and method of moving the dissociation zone up or down in a retort was disclosed. Carbon black patents, known to me prior to my above mentioned patent, disclosed the advantages of stream-line flow and non-turbulent flow as well as the disadvantages of contacting surfaces in direct contradiction to disclosures in my above patent where I also disclosed the introduction of air either axially or tangentially.

My above named process is applicable to either a single-tube furnace or to a multi-tube furnace. A disadvantage of the multi-tube furnace of commercial size is that the air and hydrocarbon mix, ignite and contact heated refractory at practically the same time and with little or no heating before contacting the heated refractory. The dissociation products after leaving the individual tubes must mix and be subjected to continued heat before being cooled.

A disadvantage in operating my above named process in a commercial size single tube is similar to that of other ordinary furnaces where because of the distance between furnace walls, the central part of the gas flow is too far removed from heated surfaces, consequently the single tube must be excessively long in order to complete the reaction. When operating the process in either of the two above cases, the products of dissociation are subjected to heat for too long a time for producing the finest carbon blacks as compared to the process of the present invention. The checkerwork, disclosed in my prior patent mentioned above, presents to the gases a plurality of flues identical in operation to the multi-tube furnace and having the same disadvantages besides the disadvantage of forming pockets for the lodgement of carbon therein which burn into coarse particles and later mix with and contaminate the final product.

Another method of producing carbon black has been to pass the hydrocarbon to be dissociated thru a layer of flame produced by complete combustion over checkerwork. The objection to such methods is that the liberated carbon reacts with the carbon dioxide of the complete combustion to form carbon monoxide which is wasteful of carbon black and furthermore the carbon black in passing thru the sieve-like checkerwork is subjected to intimate contact with a plurality of very close heated surfaces where the carbon particles are burned to a coarser product.

By other methods the reacting gases are passed thru a mixing orifice centrally located within an elongated cylindrical retort after which dissociation is completed in a continuation of the cylindrical retort. This method does not provide contact with any surface in any manner conducive to expediting the dissociation but, on the contrary, dissociation must be prolonged at high temperature which is detrimental to the product.

Regardless of just what the precise influence of heated surfaces is on the dissociation of hydrocarbons, it is definitely known that prolonged subjection to, or too intimate contact with heated surfaces such as with checkerwork is detrimental to the carbon black product. On the other hand, dissociation is difficult and slow without fairly close proximity to some limited heated surfaces, as, e.g., in the dissociation of vaporized or atomized oils, the diameter of furnace of the ordinary processes must be limited so as to confine the dissociation products close to the heated furnace wall and in order to complete the dissociation, the furnace of small diameter must be excessively long thereby subjecting the product to longer deterioration from heat. Another detrimental aspect is the excessive loss of heat thru wall of small diameter furnace. The capacity of furnace will in general vary as the square of the diameter while the outer radiating surface varies only directly with the diameter, therefore if a process permits the doubling of the furnace diameter, the capacity is increased four times while the outer radiating surface is only doubled thereby greatly reducing the radiation losses and furthermore, since the refractory walls must be of a required thickness regardless of diameter, there is a very considerable saving in the cost of refractories and duplication of piping, valves etc. where the process permits of operation in the larger capacities.

I have now discovered that the disadvantages of former processes can be overcome and that a very fine hard carbon black, having many of the characteristics of channel black, and that can be substituted for channel black, can be produced in a closed retort by establishing a continuous reaction of increasing intensity between a potentially reactive hydrocarbon and air by starting said reaction in an unobstructed passage of a generally circular cross-section and continuing between the walls of an annulus concentric with and communicating with said unobstructed passage. Air and a potentially reactive hydrocarbon are supplied separately and simultaneously and either axially or spirally to the end of an unobstructed retort passage where partial combustion is initiated and the reaction increases to the end of said unobstructed passage then the gases are directed into said annulus where they are confined between the inner and outer heated walls of annulus and the reaction proceeds with increasing intensity. In this manner the unburned hydrocarbon is dissociated almost instantly as the intensity of reaction reaches a climax. The time of exposure to heated surfaces at dissociating temperatures is lessened to only a small fraction of a second thereby preventing the deterioration of the carbon black product. My process provides for the operation of furnaces of large capacities at lowered temperatures and high efficiency. A further discovery consists in supplying additional hydrocarbons centrally at top of furnace or supplying additional hydrocarbons or air or both at bottom of furnace thru the passage formed by the inner wall of said annulus thereby providing preheating as will be shown later.

Further objects and advantages of the process of the present invention will be seen in the following description and claims and in the light of the following drawings in which like numerals of reference indicate similar parts throughout:

Fig. 1 is a central sectional elevation showing one type of apparatus suitable for carrying out the process of the present invention.

Fig. 2 is a horizontal section on line 2—2 of Fig. 1.

Fig. 3 is a horizontal section on line 3—3 of Fig. 1.

Fig. 4 is a horizontal section on line 4—4 of Fig. 1.

Fig. 5 is a central sectional elevation showing a modification of apparatus shown in Fig. 1.

Fig. 6 is a horizontal section on line 6—6 of Fig. 5.

Fig. 7 is a central sectional elevation of a still further modification of apparatus shown in Fig. 1.

Fig. 8 is a horizontal section on line 8—8 of Fig. 7.

Fig. 9 is a central sectional elevation showing a modification of apparatus shown in Figs. 1 and 5.

Fig. 10 is a horizontal section on line 10—10 of Fig. 9.

Fig. 11 is a horizontal section on line 11—11 of Fig. 9.

Fig. 12 is a horizontal section on line 12—12 of Fig. 9.

Fig. 13 is a central sectional elevation showing a modification of apparatus shown in Fig. 9.

Fig. 14 is a horizontal section on line 14—14 of Fig. 13.

Fig. 15 is a horizontal section on line 15—15 of Fig. 13.

Referring now to Fig. Nos. 1, 2, 3 and 4 of the drawings: In Fig. 1 showing one type of furnace suitable for carrying out the process of the present invention, 10 is an outer shell preferably of steel construction, 11 is the furnace lining of refractory material backed by suitable insulating material, 12 is an unobstructed cylindrical passage, 13 is a hollow cylindrical column of refractory material forming the outer annular passage 14 and the inner passage 15 communicating directly with the unobstructed passage 12 and with the outer flue 36 thru discharge passage 35. The pipe 29 is for supplying air or hydrocarbon gas or a mixture of air and hydrocarbon gas thru passages 28 and 15 to unobstructed passage 12. Fig. 2 is a section thru air chamber 17 formed by the preferably spiral shaped outer casing 20; 18, 18' etc. are nozzles formed by the vanes 21, 21' etc. These vanes can be fixed in position as at 21 or they may be adjustable as at 21' by means of the rod 22 and suitable adjusting nut 23. Fig. 3 is a section thru gas chamber 25 formed by the preferably spiral shaped outer casing 29a. The nozzles 26, 26' etc. are formed by the vanes 30, 30' etc. which may be either fixed in position or adjustable as indicated in Fig. 2. The outer flue 36 is preferably substantially tangential to outer furnace wall as shown in Fig. Nos. 1 and 4 but could as well be located in any other suitable manner or there may be more than one outlet flue as shown in Figs. 9 and 13. In Fig. 1, 19 is an air injecting tube preferably of heat resisting material and forming the outer annular enveloping spaces 27 and 28 and communicating with air chamber 17 thru nozzles 18, 18' etc.; 31 is a pipe preferably of heat resisting material for supplying a hydrocarbon to furnace centrally thru valve 32. In order to readily identify passages 12 and 15 in specification and claims, the passage 12 will be referred to as a primary passage and the passage 15 will be referred to as a secondary passage.

In one method of operating the process of the present invention, air is supplied at 16 to air chamber 17 and thence thru nozzles 18, 18' etc., in a spiral manner and thru injection tube 19 to the primary passage 12 while a hydrocarbon gas is simultaneously supplied at 24 to gas chamber 25 and thence thru nozzles 26, 26' etc. and preferably in a spiral manner thru enveloping spaces 27 and 28 to primary passage 12 where the hydrocarbon gas starts diffusing into the air flow and partial combustion is initiated in somewhat of a hollow turbulent flame as the hydrocarbon continues to diffuse inwardly from the outer flame surface and, in the preferred method of operation as explained later, the temperature of the partially burned mixture increases as it travels toward the annular passage 14 where the partially burned mixture is subjected to radiant and conductive heat from the annular passage walls as the mixture passes therethru. The temperature of the gas mixture, now exposed to heated surfaces on both the inner and outer periphery of the annular gas flow, increases rapidly with a correspondingly rapid increase in the intensity of reaction so that complete dissociation with the liberation of carbon black is almost instantaneous just before cooling to a temperature below that at which deterioration of the product is possible. The products of dissociation are discharged thru 35 into flue 36 where they are cooled preferably by a water spray to a temperature below about 2000 degrees F. The hydrocarbon is therefore subjected to a continuous reaction of increasing intensity starting in the primary passage 12 and reaching a climax in the annulus 14.

The gases leaving furnace flue 36 can be further cooled and the carbon black separated therefrom in any well known manner, as, e.g., the gases may be conducted to a cooling tower or stack where the temperature is further reduced to about 450 degrees F. to prevent the condensation of the steam and other objectionable products such as naphthalene and their contamination of the carbon black product. The conduit from furnace to cooling tower can be of considerable length to provide cooling by radiation thereby reducing the amount of cooling water required. Reducing the amount of cooling water has the advantage of reducing the volume of gases to be handled by electrical precipitation or other means and reducing the ash content of the carbon black product when the cooling water carries considerable solids.

From the cooling tower or stack the gases are preferably subjected to electrical precipitation by passing them thru a high voltage direct current ionizing field where the electrically charged carbon particles agglomerate and part will be removed in the precipitator hopper and the remainder removed by settling vessels or cyclones or both following the precipitator. The cyclones may be operated in parallel or in series or both. The carbon black may also be separated by the well known wash-box method where steam in addition to cooling water is used to expedite separation after which the carbon black is dried to volatize and remove water and any other objectionable products from the carbon black. The carbon black may also be separated from the gases by means of bag filters or any other filtering means. I prefer to follow a high voltage ionizing section of an electrical precipitator with a settling chamber having a substantial cross-sectional area and wherein the gases leaving precipitator and entering settling chamber are directed downward at increased velocity so as to throw a large percentage of the agglomerated carbon black particles down into bottom hoppers after which the gases are directed upward at lowered velocity and into a plurality of comparatively small sized but efficient cyclones operating in parallel within the upper portion of settling chamber. The small cyclones then discharge into one or more large cyclones outside of settling chamber and operating either in parallel or series or both.

Referring again to Fig. 1 of the drawings, it will be seen that the air is subjected to some preheating in passing thru injection tube 19 by the heat from the partial combustion and that the hydrocarbon is subjected to some preheating in passing thru annular space 28 by conduction from furnace wall and by radiation from the partial combustion. In operating the process of the present invention, an additional potentially reactive hydrocarbon can be supplied to, or atomized or sprayed into primary passage 12 thru pipe 31 controlled by valve 32 at top of furnace; or an additional potentially reactive hydrocarbon can be supplied at bottom of furnace thru pipe 29 and passages 28a and 15 and in a tangential manner or axially as indicated in Fig. Nos. 9 and 13; or additional air can be supplied at bottom of furnace and thru passage 15. Supplying additional air in this manner is particularly important when dissociating atomized oils. Obviously, a higher ratio of air to the hydrocarbon supplied at the top of furnace will provide for the combustion of a greater portion of the hydrocarbon within the primary passage 12 thereby producing a higher temperature therein while the additional hydrocarbon supplied at bottom of furnace thru secondary passage 15 becomes highly heated by the time it is mixed with or contacts the products of the incomplete combustion in annular passage 14 and consequently its dissociation is almost instantaneous which results in the production of high quality carbon black. The overall temperature of the process can be regulated and controlled by regulating either the air flow or the hydrocarbon flow, one method is to maintain a constant hydrocarbon flow and then regulate the air flow to control the temperature. This is usually accomplished automatically by means of a suitable thermocouple 38 in any well known manner.

In connection with admitting a higher ratio of air to gas at top of furnace as previously mentioned, it should be noted that of the total percentage of the oxides of carbon in the tail gases, it is desirable to keep the percentage of carbon monoxide (CO) as low as possible because in accounting for the oxygen of the air burned with carbon, twice as much carbon is consumed with one volume of oxygen to produce less than one-third the amount of heat as compared to carbon burned to carbon dioxide ($CO_2$) and this represents a major loss in the efficiency of the process and the carbon black that might otherwise be recovered. In order to produce heat for dissociation, one ideal method is to first burn the carbon of a hydrocarbon to $CO_2$ as far as possible and to prevent as far as possible the later reaction $CO_2+C=2CO$ which not only absorbs heat but is wasteful of otherwise recoverable carbon black. It is further desirable to burn the hydrogen of a hydrocarbon to $H_2O$ and to prevent as far as possible the later reaction $H_2O+C=H_2+CO$ which is likewise wasteful of carbon black.

Referring to Fig. Nos. 1, 5, 7 and 9 of the drawings, of the total quantity of a hydrocarbon required for the incomplete combustion of a given volume of air, only part need be introduced at 24 to primary passage 12 of furnace thus producing combustion to mainly $CO_2$ in an outer ring near the wall of the primary passage 12 and thus producing more heat with the same amount of fuel. Simultaneously a quantity of potentially reactive hydrocarbon can be introduced, as a gas or atomized or sprayed as the case may require, centrally thru pipe 31 at top of furnace to primary passage 12 or thru secondary passage 15 at bottom of furnace or thru both top and bottom connections of furnace. The hydrocarbon introduced centrally at top of furnace will be subjected to the heat from the outer ring of combustion gases and any carbon liberated will have little opportunity before entering annulus 14 for the above mentioned objectionable reaction with $CO_2$ of the outer ring of combustion gases. Carbon liberated from the hydrocarbon introduced thru 15 at lower end of furnace will have no opportunity at all to react with $CO_2$ until passing thru annulus 14 and here the dissociation is so rapid because of the heated annulus walls and the time for reaction is so limited that both of the above mentioned objectionable reactions are held to a minimum and the yield of carbon black is increased accordingly and a high quality of carbon black is maintained.

Now instead of introducing a hydrocarbon thru secondary passage 15 at bottom of furnace as in the preceding example of operation, additional air can be supplied thru secondary passage 15 in which case the process is carried out by establishing either a flow of partially combusted air and hydrocarbon or an outer flow of substantially completely combusted gases and an inner central axial flow of a potentially reactive hydrocarbon to the primary passage 12 where the hydrocarbon to be dissociated is heated to or near the dissociation point. Then a final reaction is brought about by inducing the gases from said primary passage to flow into the annular passage 14 while simultaneously the additional air supplied thru secondary passage 15 is added to the inner side of the annular gas flow where further combustion takes place, which with the heat from the annulus walls, provides a temperature effective for completing the dissociation of unburned hydrocarbons. Obviously, the process can be carried out without introducing air or a hydrocarbon at bottom of furnace, as, e.g., in operating the process as first described above for the furnace of Fig. 1, and particularly when dissociating natural gas or natural gas and a small amount of vaporized or atomized oil. The introduction of air at bottom of furnace is particularly advantageous when dissociating the larger quantities of oil.

A still further method of operating the process is to provide combustion gases from an outside source for introducing thru the secondary passage 15 or to provide a substantially combustible mixture thru secondary passage 15 and into the annular passage 14 with the effluent gases from the primary passage 12. In either case when the outer flow of combustion gases and a central flow of a potentially reactive hydrocarbon is established in the primary passage 12, the potentially reactive hydrocarbon enters the annulus 14 substantially between a layer of combustion gases on the outer side of annular gas flow and another layer of combustion gases on the inner side of annular gas flow, the dissociation being completed partly by contact with the hot combustion gases and partly by partial combustion and the heat from the annular passage walls.

It is to be noted that due to centrifugal force when utilizing spiral flow thru annulus, the inner side of annular gas flow has little tendency to actually contact the refractory wall 13, therefore a substantial amount of heating surface is provided without actual contact with the gases.

The present invention is not limited to any particular number of injection nozzles as at 18, 18' etc. of Fig. 2 or 26, 26' etc. of Fig. 3 of the drawings. These nozzles provide one method of controlling the extent of the spiral flow of air and gas but it is possible and within the scope of this invention to omit nozzles entirely and provide a spiral flow by means of the spiral shaped casings or by any other means. Since the volume of air is several times the volume of the hydrocarbon gas, the spiral injection of the hydrocarbon could be omitted and still the spiral rotation could be provided by the spiral injection of air, in fact the process is operable without the spiral injection of either gas or air. Now while all the drawings excepting Fig. 7 show apparatus suitable for establishing a spiral flow, yet the process can as well be operated with axial flow and particularly so with a down draft type of furnace which has long been established as providing an even distribution of flow without channeling. The burner design of Fig. Nos. 1, 5, 9 and 13 could therefore be altered to provide axial flow instead of spiral flow as shown, or, the manner of introducing the hydrocarbon and air can be reversed from that shown in the drawings, as, e.g., the air could as well be introduced either axially or spirally at 24 and thru 27 next to furnace wall while the hydrocarbon is introduced as at 31. It is also within the scope of the present invention to impregnate the refractory walls forming the annular passage 14 with any material which has a catalytic effect on the dissociation of hydrocarbons. I have found that hard burned incrusted carbon has a decided catalytic effect in this respect and therefore it would be possible to utilize such material as hard graphite for this purpose.

It is to be understood that while the process of the present invention is not limited to any particular operating temperature, the temperature within the furnace may lie within the range of from about 1600 degrees F. to about 2600 degrees or higher and will depend upon the capacity at which furnace is operated and the type of carbon black desired. It is obvious that when a furnace is operated at low capacity considerably less than normal capacity, the axial velocity of gases will be low and combustion will take place and the higher temperature attained nearer the point of injection of the air and hydrocarbon, the mixture is thereby subjected to high heat for a longer period of time which results in the production of a larger particle size and softer type of carbon black. On the other hand, when the furnace is operated at or above normal capacity according to the process of the present invention, the mixing of the hydrocarbon and air is slower and gradual thru primary passage 12 and toward the annular passage 14 where, as previously explained, the temperature rise is rapid with a correspondingly rapid and almost instantaneous dissociation of the hydrocarbon and liberation of carbon black therefrom. Since the volume of the gases increases with increased temperature, the axial velocity of travel is increased in annular passage 14 and can be further increased by decreasing the cross-sectional area of annulus 14 thereby reducing the time of exposure to high temperature in the annulus. The maximum temperature may be reached soon after the gases enter annulus 14 after which the temperature may decrease somewhat because of the depletion of oxygen for combustion and the absorption of heat by dissociation while with still higher capacities of operation the maximum temperature may exist at discharge passage 35. There is therefore a wide range of operation possible.

It is to be understood that while the ratio of air to hydrocarbons may vary from 4 to 6 or more volumes of air to one of hydrocarbon, yet the present invention is not limited to any particular ratio. Obviously the heavy hydrocarbons require more air than the lighter hydrocarbons and less air is required if either the hydrocarbon or air is preheated. This ratio also depends on the operating temperature maintained for, obviously, the sensible heat loss with the exit gases is higher at the higher operating temperatures and consequently more air is required to burn a greater portion of the hydrocarbon to replace this heat loss. The oxygen of the air supplied in the operation of a furnace producing carbon black should appear in the exit gases as free oxygen, as the oxygen in the oxides of carbon or as the oxygen in the water from the combustion of hydrogen but I have found from actual operation and the analysis of the exit gases that in some cases if all the oxygen of the air actually used did appear in the above manner, there would be less carbon black recovered than was actually recovered. It therefore appears that some of the oxygen forms complex compounds with or on the surface of the carbon black particles and this may have some bearing on the high quality of the carbon black produced. These compounds may be in the form of $(C_2O_3)_n$ complex and $(CO)_m$ complex. In any event considerable oxygen from the air supplied goes along with the carbon black produced. It is clear from the foregoing that claims in a process of this nature cannot be predicated upon any particular ratio of air to hydrocarbon.

In connection with the preheating of the air or hydrocarbon, it is obvious that with preheating, less combustion of fuel for heat is required within the furnace, the furnace could be smaller and operated at higher velocities of flow for any given capacity and since the time of exposure to high temperature would be less, a somewhat finer particle size of carbon black would be produced. Preheating is applicable to the process of the present invention and may be accomplished in any well known manner or by heat exchange with the exit gases. A finer particle size of carbon black can also be produced by the use of diluent gases in any well known manner such as by recycling tail gases or hot combustion gases produced by the separate combustion of fuel can be used as a diluent. The use of diluent gases and external preheating are well known. Since considerable preheating is provided for within the process of the present invention, the importance of external preheating is lessened thereby.

Referring now to the modifications of apparatus suitable for carrying out the process of the present invention and where like numerals of reference indicate similar parts thruout all the drawings, the lower portion of the furnace shown in Fig. 1 could as well be altered to that shown in Fig. 5 where the outer wall forming annular passage 14 is of larger diameter than that of the primary passage 12 thereby still further increasing the heating surfaces of annular passage 14, or the air and hydrocarbon supply of Fig. 1 could be admitted to furnace as indicated in the upper portion of Fig. Nos. 5 and 6 where the air and hydrocarbon are injected thru the refractory lining. The cross-sectional area of the primary passage 12 can be gradually increased toward annulus 14 as shown in Fig. Nos. 9 and 13, or the refractory member 13 of Fig. Nos. 1 and 5 could as well be of a conical shape or the frustum of a cone and closed at the top when it may be undesirable to introduce hydrocarbons or air thru the passage 15 for example when carbon black is produced from natural gas alone.

Another modification of apparatus suitable for carrying out the process of the present invention is shown in Fig. Nos. 7 and 8 of the drawings and where the annular passage 14 is constructed concentrically with the outside of the primary passage 12 thereby shortening the overall length of furnace and reducing the heat loss thru outside wall. The air and hydrocarbon could be admitted to furnace as in Fig. 1 or as shown at the upper portion of Fig. 7 where the air chamber 17 and gas chamber 25 are in the form of annular pipes, the air being injected to furnace thru nozzles 18, 18' etc. and the hydrocarbon thru nozzles 26, 26' etc. The unobstructed passage 12 is communicatively connected with the annular passage 14 by a plurality of passages 37, 37' etc. which may discharge the gas mixture into annular passage 14 either somewhat tangentially or radially as shown.

Referring to Fig. Nos. 9, 10, 11 and 12 of the drawings showing a further modification of Fig. Nos. 1 and 5 and suitable for carrying out the process of the present invention, the annulus 14 is preferably somewhat restricted at 14a and is extended to form the cooling passage 14b which communicates with one or more discharge flues 36. The cooling passage 14b is preferably maintained at a temperature below about 2000 degrees F. in order to prevent deterioration of the carbon black. The cooling may be accomplished with water sprays 33 controlled by valves 34 and so directed as to assist in maintaining the spiral flow of the gases. Air or a hydrocarbon can be admitted to secondary passage 15 either tangentially thru 29 or axially thru connection 42 controlled by valve 43. Fig. 12 shows a connection suitable for admitting either a hydrocarbon or air or a combustible mixture tangentially thru 29 a secondary passage 15. Air is admitted at pipe connection 37 and thru 38 and 29 to secondary passage 15 while fuel is admitted thru pipe 39 controlled by valve 40. The primary passage 12 is preferably in the shape of a diverging cone. In starting operation a combustible mixture can be admitted to furnace at both top and bottom until the temperature of the apparatus is leveled off at the operating temperature.

With the apparatus of Fig. 9, the process can be carried out in a manner to suit the type of hydrocarbon to be dissociated. Air and a hydrocarbon can be admitted at top of furnace in proportions for incomplete combustion. The reaction starts in the primary passage 12 where the temperature of the hydrocarbon is increased to or near the dissociation point then the reaction is completed almost instantaneously within the annulus 14 either with or without the addition of air thru secondary passage 15. When carbon black is to be produced from an atomized or vaporized oil or from a mixture of air and a hydrocarbon gas, air and a gaseous fuel is admitted thru connections 16 and 24 in proportions suitable for the substantially complete combustion of the gaseous fuel so as to maintain an outer ring of hot combustion gases near the wall of the primary passage 12 while the atomized or vaporized oil is introduced centrally thru pipe 31 and nozzle 31a and is subjected to the heat of the outer ring of combustion gases and its temperature is thereby increased to or near the dissociation point then all of the gases are subjected to further reaction within the annulus 14 either with or without the addition of air or combustion gases supplied thru secondary passage 15, but preferably with the addition of air. The dissociation is then completed within the annulus almost instantaneously and the temperature is then immediately reduced by the cooling sprays 33 in cooling chamber 14b. The gases are then discharged thru one or more flues 36 to further cooling and carbon black collecting means as described for Fig. 1. From the foregoing it will be seen that when additional air is supplied at bottom of furnace thru secondary passage 15 which is one preferred method of operation, the flow of the hydrocarbon to be dissociated indicated by the arrow B of Fig. 9, passes into the annulus 14 between the outer ring of combustion gases indicated by the arrow A and the inner ring of combustion gases indicated by the arrow C. Obviously a portion of the hydrocarbon for dissociation will be burned to produce heat but the remainder will be dissociated almost instantly from the heat of the surrounding gases and the heat from the annulus walls.

Fig. Nos. 13, 14 and 15 show a modification of the apparatus of Fig. 9 and suitable for carrying out the process of the present invention. The operation of this furnace is substantially the same as for the furnace of Fig. 9. The main difference in construction is the burner shown in Fig. 15 and the secondary passage 15a which is closed in at 45 and the air is supplied to annulus thru passages 46, 46' and 47. Referring to Fig. 15, air is supplied thru one or more burner pipes 41 and 42 to primary passage 12 while the hydrocarbon fuel is supplied thru central burner pipe 43 controlled by valve 44. The inner wall 13b of annulus can be supported by outer wall 11 with suitable connections 48 and preferably shaped so as not to obstruct the spiral flow of gases thru annulus 14 and into cooling passage 14b when spiral flow is utilized. It should be noted that a downward flow of gases is preferable so as to give the reverse of a chimney draft. The back pressure thus produced serves to maintain a uniform distribution of gases.

It is obvious that in the normal operation of the process of the present invention, the furnace can be divided into the so called zones, as, e.g., a mixing and diffusion zone, a zone of progressive incomplete combustion, an active high temperature zone where dissociation is rapid and a final zone of decreasing temperature. No claim is made to these so called predetermined zones since they are natural and inherent characteristics of a furnace process, as, e.g., the location of dissociation zone can be changed at will as was disclosed above herewith and in my above mentioned Patent 2,163,630.

There are obviously still other modifications of the apparatus suitable for carrying out the process of the present invention for while I have described a furnace having a generally circular cross-section yet it must be understood that other shapes could be used and particularly when spiral flow is not used. It is therefore to be understood that this invention is not limited to the details of construction shown in the drawings.

From the foregoing specification it will be obvious that I have provided a new and novel method of producing carbon black of fine hard quality, even harder than channel black and having many of the characteristics of channel black and one that can be substituted for channel black and under certain conditions of operation the softer blacks can be produced. The process of the present invention also permits of a wide range in raw materials from hydrocarbon-containing gases to oils and mixtures of the same.

Obviously there are other ways of carrying out the process of the present invention without departing from the spirit and scope of the present invention, therefore I do not wish to be understood as limiting myself except by the following claims when construed in the light of the prior art.

I claim:

1. Apparatus for producing carbon black comprising a chamber of a generally circular cross-section and having a central axis, a tangentially open drum axially disposed at one end of said chamber, a second tangentially open drum surrounding said first drum and disposed at said end of said chamber, hydrocarbon injector means disposed at said end of said chamber and extending into said chamber coaxially with said drums and said chamber, an end wall closing the other end of said chamber, a tube of a generally circular cross-section extending thru said end wall axially into said chamber to define an annular passage, means defining a reduction in the cross-sectional area of said annular passage and positioned substantially midway of the length of said annular passage, cooling medium injector means projecting thru the side wall of said chamber into the after end of said annular passage, and means defining an outlet opening from said annular passage.

2. Apparatus for producing carbon black comprising a refractory lined retort having front and rear end walls and a side wall of a generally circular cross-section to define an unobstructed primary passage at one end thereof, a hydrocarbon injector tube extending axially thru said front end wall into said primary passage, at least one burner port extending thru said side wall of and into said primary passage, a tube of a generally circular cross-section extending thru said rear end wall axially into said retort to define an annular passage between said tube and said side wall of said retort, the inside of said tube defining a secondary passage communicating with said primary passage, means defining a reduction on cross-sectional area of said annular passage and positioned substantially midway of the length of said annular passage, cooling medium injector means projecting thru said side wall of said retort into the after end of said annular passage, means defining an outlet opening from said annular passage.

3. Apparatus as described in claim 2 in which at least one burner port is so positioned as to provide a spiral flow of gases.

4. Apparatus as described in claim 2 in which said tube defining said annular passage is provided with at least one tangentially positioned side opening at its outer end.

5. Apparatus as described in claim 2 in which said tube defining said annular passage is closed at its inner end and provided with at least one opening thru its side wall communicating with said annular passage.

6. Apparatus for producing carbon black by the dissociation of a hydrocarbon by incomplete combustion in contact with hot gases including: a non-obstructed passage comprising a chamber in which the hydrocarbon is raised to the temperature of dissociation; means for supplying a hydrocarbon and a combustible mixture to one end of said non-obstructed passage; an annular passage communicating directly with the other end of said non-obstructed passage comprising a chamber in which final reaction and dissociation takes place; and a discharge passage communicating directly with said annular passage for removing the dissociated carbon from said annular passage; said supply means comprising a first open ended drum concentrically disposed at one end of said unobstructed passage; a second open ended drum surrounding said first drum and disposed at said end of said unobstructed passage; a plurality of nozzles tangentially arranged in the wall of one of said drums for supplying air to said passage; and a plurality of nozzles tangentially arranged in the wall of the other of said drums for supplying a hydrocarbon to said passage.

7. Apparatus for producing carbon black by the dissociation of a hydrocarbon by incomplete combustion in contact with hot gases including: a non-obstructed passage comprising a chamber in which the hydrocarbon is raised to the temperature of dissociation; means for supplying a hydrocarbon and a combustible mixture to one end of said non-obstructed passage; an annular passage communicating directly with the other end of said non-obstructed passage comprising a chamber in which final reaction and dissociation takes place; and a discharge passage communicating directly with said annular passage for removing the dissociated carbon from said annular passage; said supply means comprising a first open ended drum concentrically disposed at one end of said non-obstructed passage; a second open ended drum surrounding said first drum and disposed at said end of said chamber; a plurality of nozzles tangentially arranged in the wall of one of said drums for supplying air to said passage; a plurality of nozzles tangentially arranged in the wall of the other of said drums for supplying a hydrocarbon to said passage; and means arranged axially with respect to both of said drums for supplying an additional hydrocarbon to said end of said unobstructed passage.

References Cited in the file of this patent

UNITED STATES PATENTS

| 2,343,866 | Hincke | Mar. 14, 1944 |
| 2,375,795 | Krejci | May 15, 1945 |
| 2,391,067 | Mitchell | Dec. 18, 1945 |
| 2,417,606 | Mitchell et al. | Mar. 18, 1947 |
| 2,420,999 | Ayers | May 27, 1947 |
| 2,519,696 | Orr | Aug. 22, 1950 |
| 2,556,196 | Krejci | June 12, 1951 |

FOREIGN PATENTS

| 664,033 | Great Britain | Jan. 2, 1952 |